United States Patent
Li et al.

(10) Patent No.: US 11,721,072 B2
(45) Date of Patent: *Aug. 8, 2023

(54) INTERACTIVE AUGMENTED REALITY SYSTEM

(71) Applicant: Snap Inc., Santa Monica, CA (US)

(72) Inventors: David Li, London (GB); Piers George Cowburn, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,941

(22) Filed: Jul. 29, 2022

(65) Prior Publication Data

US 2022/0366616 A1    Nov. 17, 2022

Related U.S. Application Data

(63) Continuation of application No. 17/373,035, filed on Jul. 12, 2021, now Pat. No. 11,481,932, which is a continuation of application No. 16/566,379, filed on Sep. 10, 2019, now Pat. No. 11,107,255.

(60) Provisional application No. 62/799,667, filed on Jan. 31, 2019.

(51) Int. Cl.
| | |
|---|---|
| *G06T 19/00* | (2011.01) |
| *G06T 11/00* | (2006.01) |
| *G06T 15/04* | (2011.01) |
| *G06T 19/20* | (2011.01) |
| *G06F 3/04845* | (2022.01) |

(52) U.S. Cl.
CPC .............. *G06T 19/00* (2013.01); *G06T 11/00* (2013.01); *G06T 15/04* (2013.01); *G06T 19/006* (2013.01); *G06T 19/20* (2013.01); *G06F 3/04845* (2013.01); *G06T 2200/24* (2013.01)

(58) Field of Classification Search
None
See application file for complete search history.

(56) References Cited

U.S. PATENT DOCUMENTS

| | | |
|---|---|---|
| 11,107,255 B2 | 8/2021 | Li et al. |
| 2005/0001852 A1 | 1/2005 | Dengler et al. |
| 2013/0044128 A1 | 2/2013 | Liu et al. |
| 2018/0190032 A1 | 7/2018 | Barnett et al. |
| 2018/0210628 A1 | 7/2018 | Mcphee et al. |
| 2020/0221070 A1 | 7/2020 | Godar |
| 2020/0250858 A1 | 8/2020 | Li et al. |
| 2020/0368616 A1 | 11/2020 | Delamont |
| 2021/0343050 A1 | 11/2021 | Li et al. |

FOREIGN PATENT DOCUMENTS

| | | |
|---|---|---|
| CN | 113366413 A | 9/2021 |
| WO | WO-2020160245 A1 | 8/2020 |

OTHER PUBLICATIONS

U.S. Appl. No. 16/566,379 U.S. Pat. No. 11,107,255, filed Sep. 10, 2019, Interactive Augmented Reality System.

(Continued)

*Primary Examiner* — Jwalant Amin
(74) *Attorney, Agent, or Firm* — Schwegman Lundberg & Woessner, P.A.

(57) ABSTRACT

Example embodiments described herein relate to an augmented-reality system to generate and cause display of interactive augmented reality content at a client device.

20 Claims, 11 Drawing Sheets

(56) References Cited

OTHER PUBLICATIONS

U.S. Appl. No. 17/373,035, filed Jul. 12, 2021, Interactive Augmented Reality System.
"U.S. Appl. No. 16/566,379, Non Final Office Action dated Jan. 6, 2021", 20 pgs.
"U.S. Appl. No. 16/566,379, Notice of Allowance dated Apr. 30, 2021", 8 pgs.
"U.S. Appl. No. 16/566,379, Response filed Mar. 30, 2021 to Non Final Office Action dated Jan. 6, 2021", 10 pgs.
"U.S. Appl. No. 17/373,035, Non Final Office Action dated Apr. 28, 2022", 13 pgs.
"U.S. Appl. No. 17/373,035, Notice of Allowance dated Jun. 9, 2022", 7 pgs.
"U.S. Appl. No. 17/373,035, Response filed May 26, 2022 to Non Final Office Action dated Apr. 28, 2022", 7 pgs.
"European Application Serial No. 20711356.4,Response Filed Mar. 16, 2022 to Communication pursuant to Rule 161 (1 ) and Rule 162 EPC dated Sep. 7, 2021", 22 pgs.
"International Application Serial No. PCT/US2020/015846, International Preliminary Report on Patentability dated Aug. 12, 2021", 9 pgs.
"International Application Serial No. PCT/US2020/015846, International Search Report dated May 8, 2020", 4 pgs.
"International Application Serial No. PCT/US2020/015846, Written Opinion dated May 8, 2020", 7 pgs.

400

```
CAUSING DISPLAY OF A PRESENTATION OF AN ENVIRONMENT WITHIN A
GUI AT A CLIENT DEVICE, THE PRESENTATION OF THE ENVIRONMENT
INCLUDING A DISPLAY OF AN OBJECT AT A POSITION WITHIN THE
ENVIRONMENT
402
           ↓
IDENTIFYING THE OBJECT BASED ON THE DISPLAY OF THE OBJECT IN
THE PRESENTATION OF THE ENVIRONMENT
404
           ↓
ACCESSING A TEXTURE MAP AND A MESH-MODEL ASSOCIATED WITH THE
OBJECT RESPONSIVE TO THE IDENTIFYING THE OBJECT
406
           ↓
GENERATING INTERACTIVE CONTENT BASED ON THE TEXTURE MAP AND
THE MESH-MODEL ASSOCIATED WITH THE OBJECT
408
           ↓
CAUSING DISPLAY OF THE INTERACTIVE CONTENT WITHIN THE
PRESENTATION OF THE ENVIRONMENT, BASED ON THE POSITION OF THE
DISPLAY OF THE OBJECT
410
           ↓
RECEIVING AN INTERACTION INPUT FROM THE CLIENT DEVICE
412
           ↓
PRESENTING A VISUALIZATION OF THE INTERACTION INPUT WITHIN THE
PRESENTATION OF THE ENVIRONMENT, THE VISUALIZATION OF THE
INTERACTION INPUT BASED ON AT LEAST THE INTERACTIVE CONTENT
414
```

*FIG. 4*

INTERACTIVE AUGMENTED REALITY SYSTEM

PRIORITY

This application is a continuation of U.S. patent application Ser. No. 17/373,035, filed on Jul. 12, 2021, which is a continuation of U.S. patent application Ser. No. 16/566,379, filed on Sep. 10, 2019, which claims the benefit of priority of U.S. Provisional Application Ser. No. 62/799,667, filed on Jan. 31, 2019, each of which are hereby incorporated by reference herein in their entireties.

TECHNICAL FIELD

Embodiments of the present disclosure relate generally to mobile computing technology and, more particularly, but not by way of limitation, to systems for generating and displaying interactive augmented reality content at a client device.

BACKGROUND

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of causing display of interactive AR content at a client device, according to certain example embodiments.

DETAILED DESCRIPTION

Figure 1:
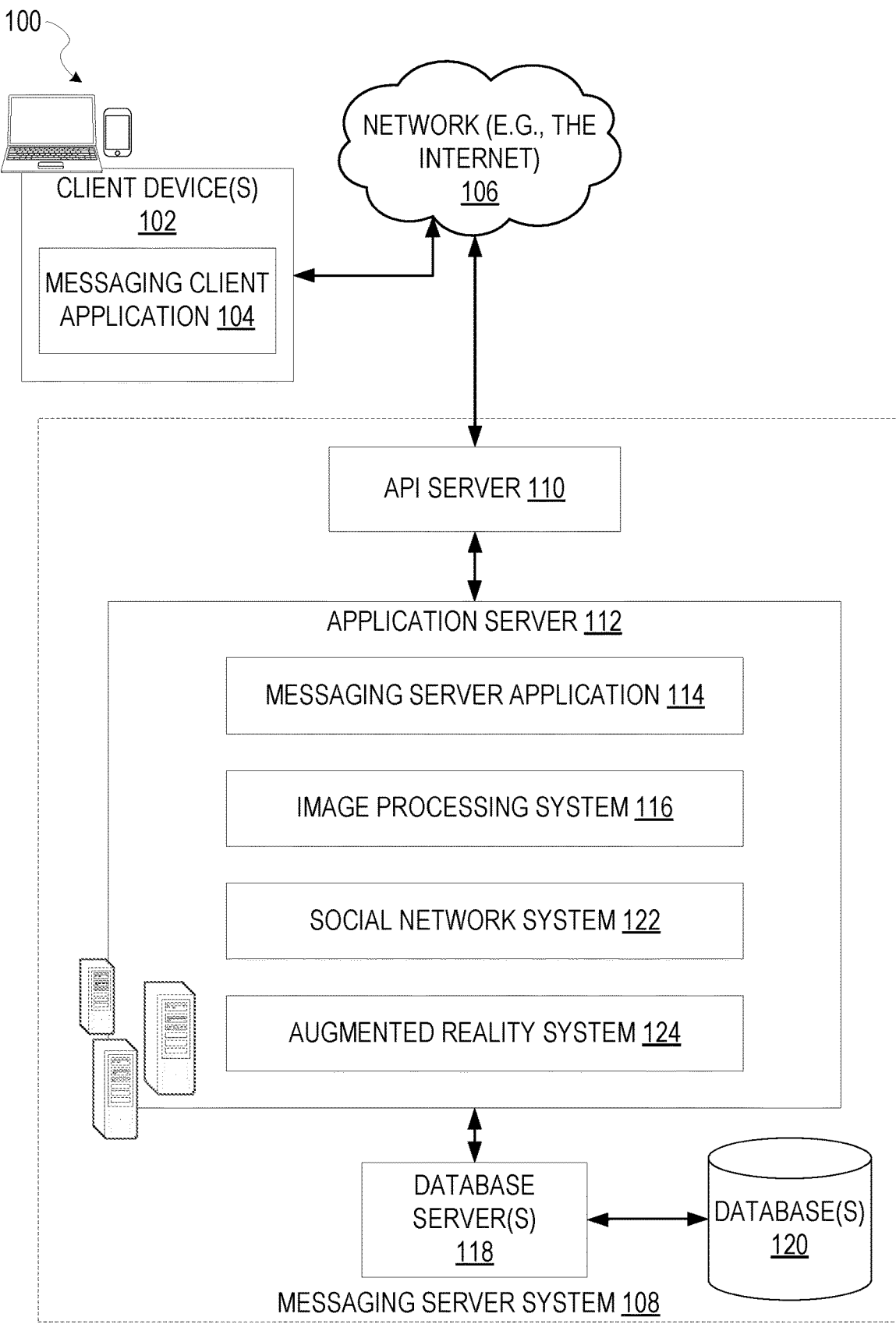
FIG. 1 is a block diagram showing an example messaging system for exchanging data (e.g., messages and associated content) over a network in accordance with some embodiments, wherein the messaging system includes a contextual filter system.

As discussed above, AR systems provide users within graphical user interfaces (GUI) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment.

Example embodiments described herein relate to an AR system to generate and cause display of interactive AR content at a client device. According to certain embodiments, the AR system is configured to perform operations that include: causing display of a presentation of an environment within a graphical user interface at a client device, wherein the presentation of the environment includes a display of an object at a position within the environment; identifying the object responsive to the causing display of the presentation of the environment that includes the display of the object; accessing a texture map and a mesh-model associated with the object; generating interactive content based on the texture map and the mesh-model associated with the object; causing display of the interactive content within the presentation of the environment, based on the position of the display of the object within the presentation of the environment; receiving an interaction input from the client device; and presenting a visualization of the interaction input within the presentation of the environment, the visualization of the interaction based on at least the interactive content.

The interactive AR content may enable a user to interactively extend and bend one or more buildings or other real-world objects in real-time through an AR presentation of an environment displayed at a client device. According to certain embodiments, the interactive AR system maintains a repository of mesh-models mapped or otherwise linked to real-world object, for example based on locations of the objects (e.g., geolocation data), or based on visual characteristics of the objects.

In some embodiments, the mesh-models may comprise a "cap mesh," a "base mesh," and a repeatable segment located between the cap mesh and the base mesh. To generate and cause display of the AR content, the interactive AR system presents the base mesh at a position within the presentation of the environment based on the position of the real-world object in the presentation of the environment, and then tile the repeatable segment along an extended, possibly non-straight spine of variable length and curvature (based on user input), and then render the cap mesh on the end of the spine, aligned to the end spine direction.

In some embodiments, the selection of the segment of the original mesh-model to cut and tile may be based on manual user input, or in some embodiments, may be based on one or more automated segment selection methods. For example, in some embodiments, the interactive AR system generates a semantic texture map with a class based on attributes of the object. The interactive AR system may then use the semantic texture map to find other similar attributes of the object, based on the class of the texture map that are contiguous in the horizontal, and in some embodiments vertical, plane in the object space. The best of such rows is selected and segmented from the display of the object.

Once a segment of the original mesh-model is selected, the segment may be tiled along the extended spine, based on the curvature and length of the extended spine. In some embodiments, where the cap mesh and the base mesh are similar, both geometrically and visually, the interactive AR system simply stacks the repeatable segment directly on top of one another to fill the space between the cap mesh and the base mesh, along the spine. In further embodiments, where the cap mesh and the base mesh are not similar, either geometrically or visually, the repeatable segments may be tiled along the spine such that every other repeatable segment is mirrors vertically (or in some embodiments horizontally) so that the top of the segment always connects to the original top (flipped) of the next segment, and the bottom always connects to the original bottom of the preceding segment.

In some embodiments, the representation of the spine may include a polyline that consists of N points and N−1 line segments connecting the points together. The interactive AR system may compute an orthogonal frame (tangent, normal, and bi-tangent) for each point on the polyline that smoothly varies from the start of the polyline to the end of the polyline. In such embodiments, the first point of the spine may be exactly at the end of the base mesh and the coordinate frame is set to the identity such that the first tiled segment attaches perfectly to the base mesh, and the last point of the spine is the beginning of the cap mesh.

Accordingly, a user may interactively extend the spine by moving the end point further away from the penultimate point and adding new points to the end when the final segment length becomes too long to maintain even sampling. The user may also interactively retract the spine by moving the end point closer to the penultimate point and remove points from the end when they merge with the penultimate point. In some embodiments, the interactive AR system may restrict the curvature of the extension or retraction based on attributes of the presentation of the environment, including relative positions of objects within the presentation of the environment, a perspective of a user to the objects within the presentation of the environment, as well as a display area of the GUI in which the presentation of the environment is presented. The user may also interactively bend the entire spine by dragging any point on the spine. In such embodiments, the interactive AR system may run an implicit constraint based physical simulation on the spine to animate it in response to the interaction inputs received from the client device, and to keep the spine evenly sampled and to remove regions of too high curvature.

In some embodiments, the interactive AR system may also extend or bend the spine programmatically without any direct user interaction to automatically animate the extended object. To render the extended object, the interactive AR system calculates a cubic spline that smoothly interpolates the points on the polyline, and then computes how many repeatable segments are needed to completely cover the spine between the base mesh and the cap mesh.

In some example embodiments, the identification of the object may be based on one or more identification factors that include location information, visual information, as well as user inputs. In certain embodiments, the AR system may retrieve location data from a client device and identify one or more object proximate to the client device based on the location data. For example, the AR system may access a data repository that comprises a plurality of object locations, wherein a given object may be referenced or identified based on its corresponding location in the data repository (e.g., geo-location coordinates). In further embodiments, the identification may be based on visual information, such as image recognition, or based on a codes image associated with the object, such as a Quick Response Code (QR code), or barcode.

Responsive to identifying one or more objects depicted in the presentation of the environment, the AR system accesses texture maps and mesh-models associated with the one or more objects. In some embodiments, accessing the texture maps and mesh-models associated with the one or more objects may include accessing contextual data associated with the client devices, and accessing texture maps and mesh-models associated with the one or more object and the contextual data. For example, the contextual data may include user profile data, location data, as well as temporal data.

As an illustrative example, the AR system may retrieve a different mesh-models and texture maps associated with the one or more objects, depending upon the context of the client device. Accordingly, a different mesh-model and texture map may be selected based on temporal information (e.g., day or night, time of day, time of year), user profile data, such as user preferences and user demographics information, as well as a number of client devices in proximity with the client device.

In some embodiments, the AR system may perform operations that include receiving an interaction input from the client device and presenting a visualization of the interaction input within the presentation of the environment at the client device. For example, the interaction input may include an input that transforms or alters the display of the object within the presentation of the space, by stretch or deforming a shape and size of the object.

In further embodiments, the interaction input may include a trajectory to be applied to a projectile element to be presented within the presentation of the space. For example, a user of the client device may provide a tactile input that indicates a starting point, a direction, and magnitude to be applied to the projectile. Responsive to the receiving the input, the AR system causes display of the projectile element within the presentation of the space based on the trajectory, such that the projectile element may start at the starting point defined by the input, and travel through the presentation of the environment to a termination point, wherein the termination point is based on the trajectory.

In some embodiments, responsive to determining that the termination point of the projectile element coincides with a portion of the interactive content, the AR system may cause display of a notification at one or more client devices.

As an illustrative example from a user perspective, the interactive content may include an animated depiction of the object that includes a target element, and the interaction input may enable a user to launch projectile elements at the animated depiction of the object, wherein the projectile elements may include one or more graphical properties based on contextual data (e.g., user profile data, temporal data, location data). Responsive to determining that a projectile element launched by a user hits the target element of the animated depiction of the object, the AR system may present a notification, such as a display of a score, or an alert.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an augmented reality system 124. The augmented reality system 124 is configured to generate and cause display of interactive AR content at the client device 102. Further details of the augmented reality system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
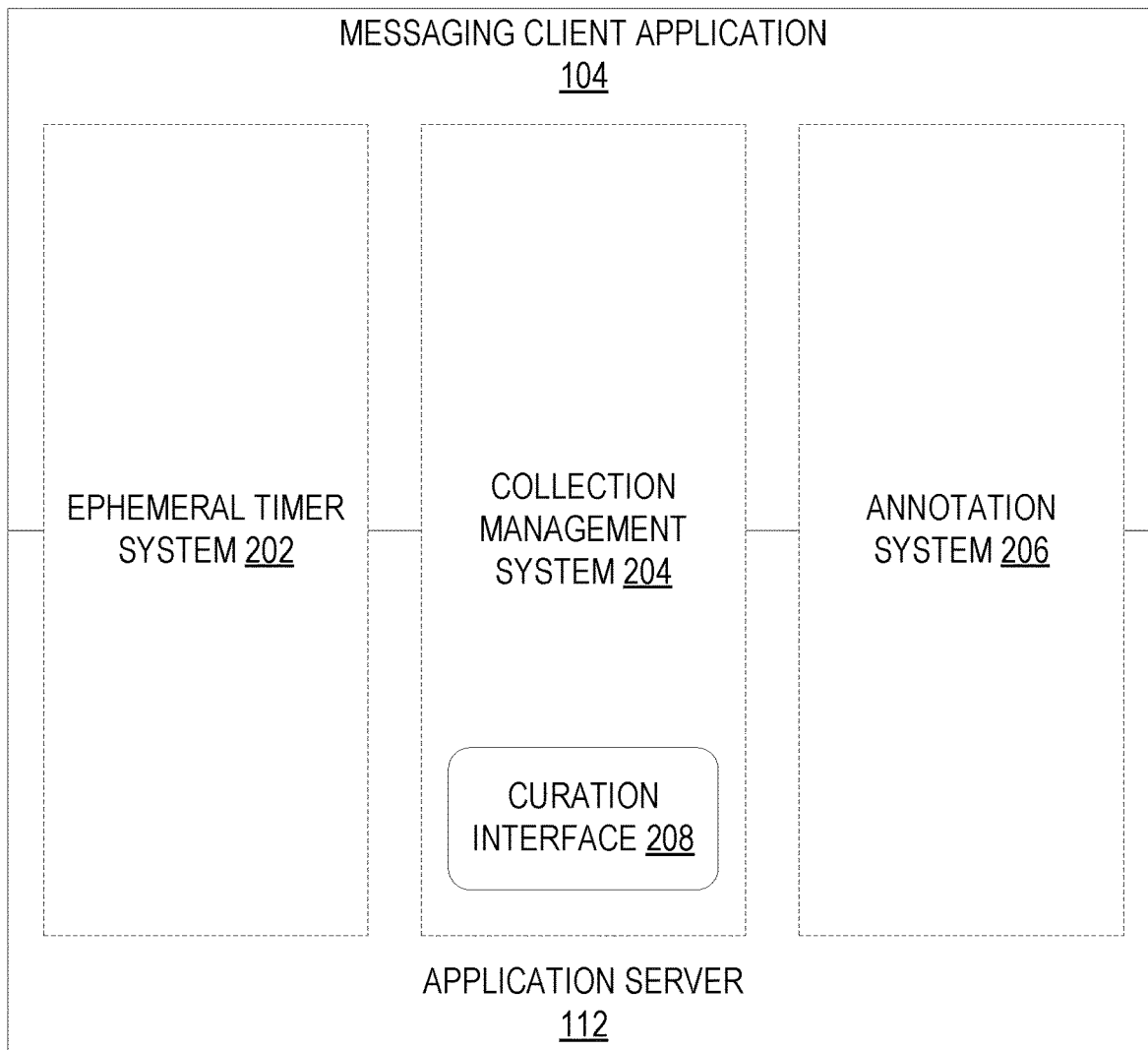
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the augmented reality system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
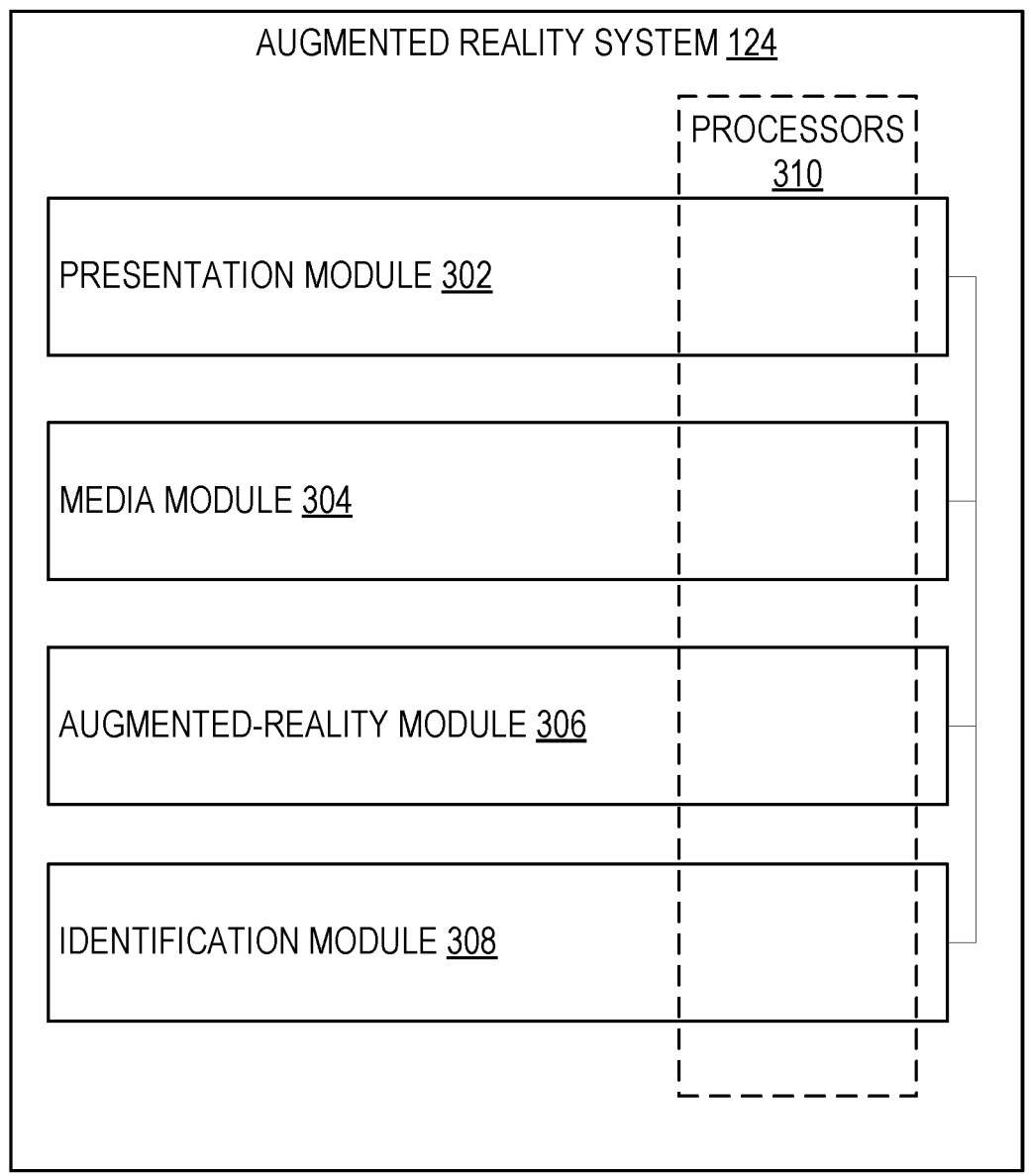
FIG. 3 is a block diagram illustrating various modules of a contextual filter system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the augmented reality system 124 that configure the augmented reality system 124 to perform operations to generate and cause display of interactive AR content at a client device 102, according to some example embodiments, and as depicted in FIGS. 7, 8, 9, and 10.

The augmented reality system 124 is shown as including a presentation module 302, a media module 304, an augmented-reality (AR) module 306, and an identification module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the augmented reality system 124 may physically include an arrangement of one or more of the processors 310 (e.g., a subset of or among the one or more processors of the machine) configured to perform the operations described herein for that module. As another example, any module of the augmented reality system 124 may include software, hardware, or both, that configure an arrangement of one or more processors 310 (e.g., among the one or more processors of the machine) to perform the operations described herein for that module. Accordingly, different modules of the augmented reality system 124 may include and configure different arrangements of such processors 310 or a single arrangement of such processors 310 at different points in time. Moreover, any two or more modules of the augmented reality system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of causing display of interactive AR content at a client device 102, according to certain example embodiments. Operations of the method 400 may be performed by the modules described above with respect to FIG. 3. As shown in FIG. 4, the method 400 includes one or more operations 402, 404, 406, 408, 410, 412, and 414.

At operation 402, the presentation module 302 generates and causes display of a presentation of an environment within a GUI at a client device 102, wherein the presentation of the environment includes a display of one or more objects at positions within the environment. For example, the presentation module 302 may access a camera associated with the client device 102 to generate the presentation of the environment by streaming image and video data from the camera of the client device 102.

According to certain embodiments, the presentation of the environment includes a presentation of a real-world environment.

At operation 404, the identification module 308 identifies one or more objects within the presentation of the environment, and the positions of the one or more objects within the presentation of the environment, in response to the causing display of the presentation of the environment within the GUI at the client device 102. For example, the identification module 308 may perform one or more object recognition techniques, including but not limited to machine learning-based approaches as well as deep learning-based approaches.

For example, in machine learning approaches, the identification module 308 may define features using one or more methods (such as Viola-Jones object detection framework based on Haar features, scale-invariant feature transform (SIFT), and histogram of oriented gradients (HOG) features), then using a technique such as support vector machine (SVM) to identify the one or more objects.

In further embodiments, the identification module 308 may apply deep learning techniques to do end-to-end object detection without specifically defining features through a convolutional neural networks (CNN).

In some example embodiments, the identification module 308 may identify the one or more objects may be based on one or more identification factors that include location information, visual information, as well as user inputs. For example, the identification module 308 may retrieve location data from the client device 102 and identify the one or more objects proximate to the client device 102 based on the location data of the client device 102. For example, the AR system may access a data repository that comprises a plurality of object locations, wherein a given object may be referenced or identified based on its corresponding location in the data repository (e.g., geo-location coordinates). In further embodiments, the identification may be based on visual information, such as image recognition, or based on a codes image associated with the object, such as a Quick Response Code (QR code), or barcode.

At operation 406, in response to the identification module 308 identifying the one or more objects within the presentation of the environment presented within the GUI of the client device 102, the AR module 306 accesses texture maps and mesh models associated with the one or more objects at the positions within the presentation of the environment.

According to certain example embodiments, the texture maps may include semantic texture maps, wherein the AR module 306 may access the semantic texture maps based on a set of semantic features of the one or more objects in the presentation of the environment. Semantic features may for example include: contextual features that correspond with a physical object, location, or surface; analogical features that reference some other known category or class; visual features that define visual or graphical properties of a surface or object; as well as material parameters that define properties of a surface or object and which may include a "roughness value," a "metallic value," a "specular value," and a "base color value."

In some embodiments, the mesh-models accessed by the AR module 306 may comprise a "cap mesh," a "base mesh," and a repeatable segment located between the cap mesh and the base mesh.

In some embodiments, the AR module 306 may access the texture maps and mesh-models associated with the one or more objects based on contextual data associated with the client device 102. For example, the contextual data may include user profile data, location data, as well as temporal data. As an illustrative example, the AR module 305 may retrieve a different mesh-model and texture map associated with the one or more objects depending upon the context of the client device. Accordingly, a different mesh-model and texture map may be selected based on temporal information (e.g., day or night, time of day, time of year), user profile data such as user preferences and user demographics information, as well as a number of client devices in proximity with the client device 102, and user profile data associated with the client devices in proximity with the client device 102.

In some embodiments, the texture maps and mesh-models may be associated with the one or more objects depicted in the presentation of the environment based on geo-location information associated with the one or more objects. For example, according to certain example embodiments, the AR module 306 may access the databases 120, wherein the databases 120 includes a listing of one or more objects in a particular location. Accordingly, based on location data retrieved from the client device 102, the AR module 306 may access an appropriate listing of objects at the location, wherein each object among the listing of the objects is associated with a texture map and mesh-model.

At operation 408, the media module 304 generates interactive content to be presented within the presentation of the environment at the client device 102 based on the texture map and mesh-model associated with the one or more objects identified in the presentation of the environment. At operation 410, the presentation module 302 causes display of the interactive content at a position within the presentation of the environment based on positions of the one or more objects depicted in the presentation of the environment, and a location of the client device 102 relative to the positions of the one or more objects depicted in the presentation of the environment.

At operation 412, the AR module 306 receives an interaction input from the client device 102. For example, the interaction input may include an input that selects a portion of the interactive content. According to certain example embodiments, the interaction input may extend or bend the interactive content in real-time. In response to the AR module 306 receiving the interaction input from the client device 102, at operation 414 the AR module 306 presents a visualization of the interaction input within the presentation of the environment based on the interaction input and the interactive content.

As an illustrative example, the interactive content may comprise a display of a media overlay, wherein an appearance of the media overlay is based on attributes of an object from among the one or more objects depicted in the presentation of the environment; for example, the media overlay may appear as a lamp post. A user of the client device 102 may provide an interaction input that selects the top of the lamp post and moves it from a starting position to an end position. In response, the AR module 306 present a visualization based on the interaction input, by causing the lamp post to move (i.e., bend or stretch).

Figure 5:
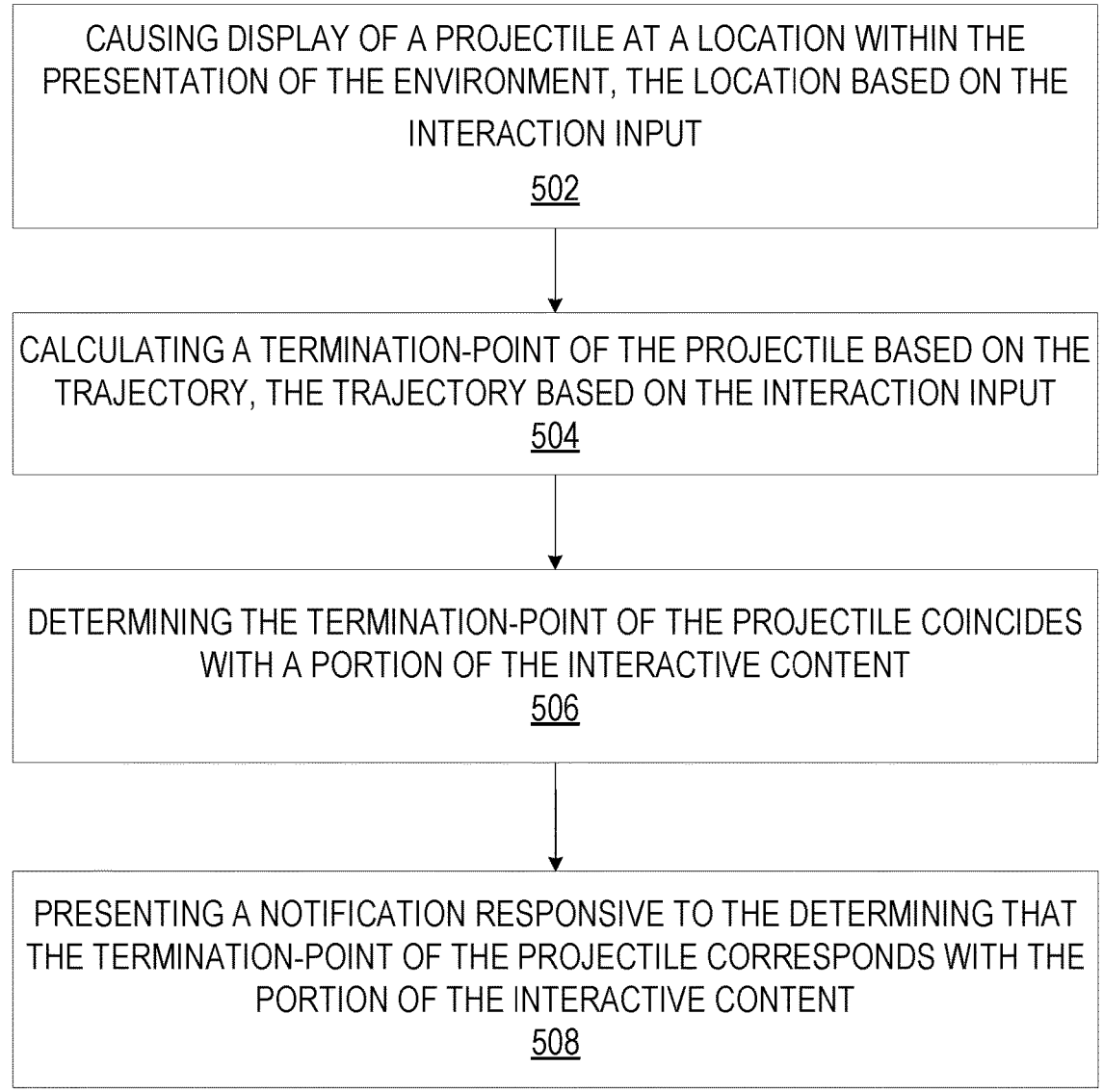
FIG. 5 is a flowchart depicting a method of causing display of interactive AR content at a client device, according to certain example embodiments.

FIG. 5 is a flowchart depicting a method 500 of causing display of interactive AR content at a client device 102, according to certain example embodiments. Operations of the method 500 may be performed by the modules described above with respect to FIG. 3. As shown in FIG. 5, the method 400 includes one or more operations 502, 504, 506, and 508.

According to certain example embodiments, the interaction input received from the client device 102 may cause display of a graphical projectile at a location within the presentation of the environment. For example the interaction input may select a location within the presentation of the environment, and comprise a directional input that comprises input attributes (i.e., a direction, a velocity value, a force value).

At operation 504, the AR module 306 calculates a termination point of the projectile within the presentation of the environment based on a trajectory of the projectile, wherein the trajectory may be based on the input attributes of the interaction input.

At operation 506, the AR module 306 determines the termination point of the projectile coincides with a portion of the interactive content presented within the presentation of the environment.

At operation 508, responsive to determining that the termination point of the projectile coincides with a portion of the interactive content presented within the presentation of the environment, the presentation module 302 causes display of a notification at one or more client devices, including client device 102. In some embodiments, the identification module 308 may identify one or more client devices based on attributes of the interactive content or based on user profile data associated with a user of the client device 102 or based on location data from the one or more client devices. For example, the identification module 308 may identify one or more client devices located within a particular geo-fence associated with the interactive content.

Figure 6:
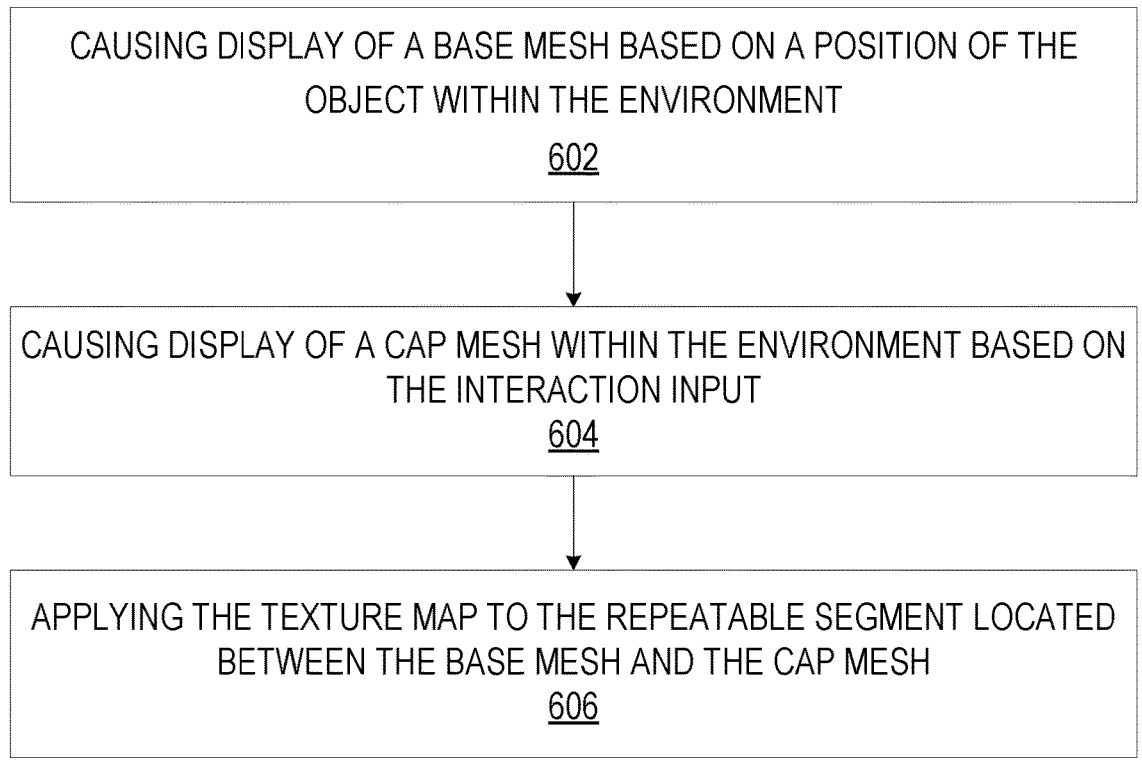
FIG. 6 is a flowchart depicting a method of causing display of interactive AR content at a client device, according to certain example embodiments.

FIG. 6 is a flowchart depicting a method 600 of causing display of interactive AR content at a client device 102, according to certain example embodiments. Operations of the method 600 may be performed by the modules described above with respect to FIG. 3. As shown in FIG. 6, the method 400 includes one or more operations 602, 604, and 606. According to certain example embodiments, the method 600 may be performed as a subroutine of operations 408 and 414 of the method 400 depicted in FIG. 4.

At operation 602, the AR module 306 causes display of a base mesh within the presentation of the environment based on at least a position of an object within the presentation of the environment.

At operation 604, the AR module 306 causes display of a cap mesh within the presentation of the environment based on the interaction input received from the client device 102. For example, the interaction input may identify a point within the presentation of the environment.

Figure 7:
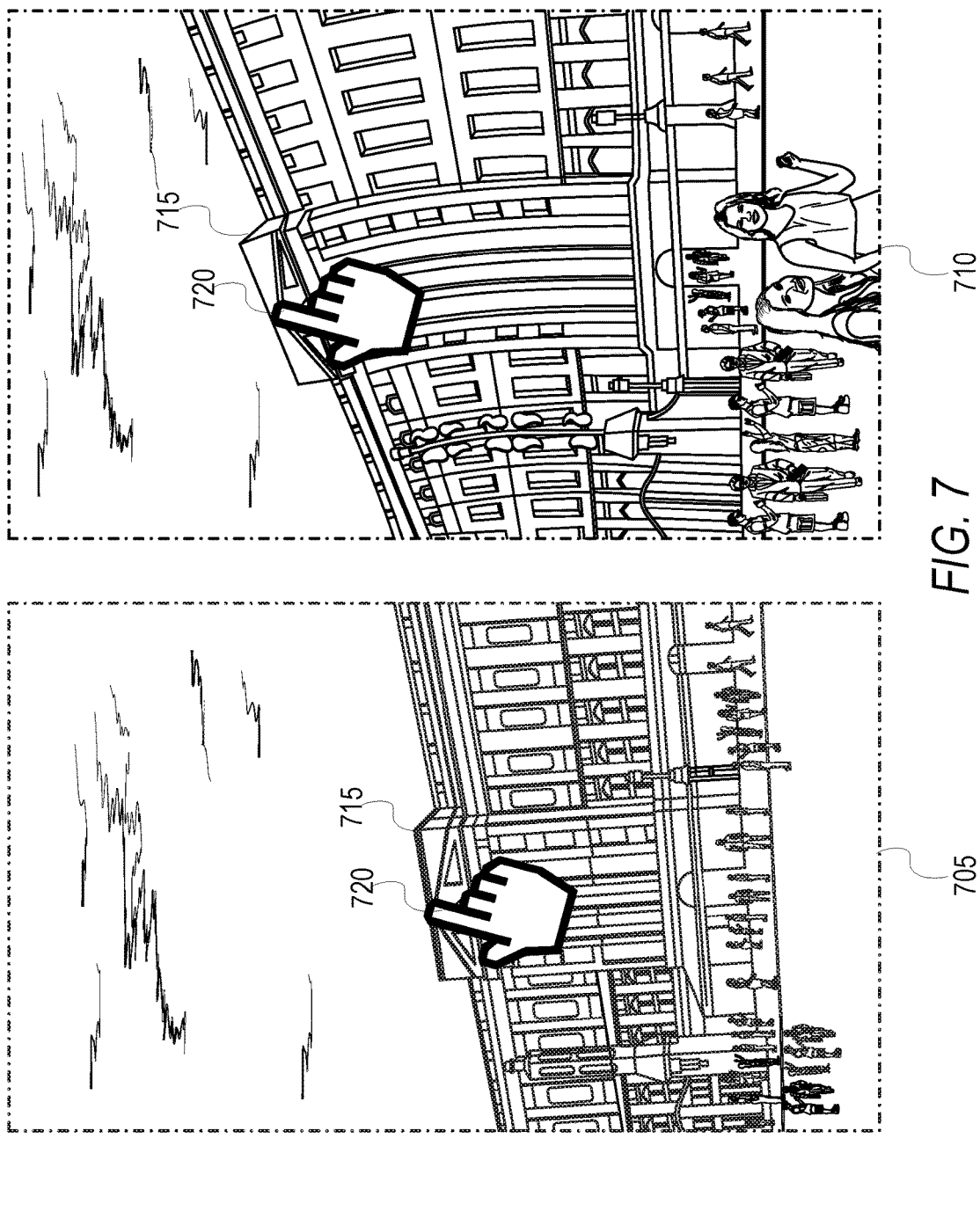
FIG. 7 is an interface flow-diagram depicting interactive AR content, according to certain example embodiments.

At operation 606, the AR module 306 applies the texture map to a repeatable segment located between the base mesh and the cap mesh, as depicted in the interface flow-diagram 700 depicted in FIG. 7.

FIG. 7 is an interface flow-diagram 700 depicting interactive AR content 715, according to certain example embodiments, and as described in the methods 400 and 600. As seen in FIG. 7, the interactive AR content 715 may include a media overlay based on an object (a building) presented within a presentation of an environment.

Accordingly, as seen in the interface 705, a user of a client device 102 may provide the interaction input 720, wherein the interaction input 720 selects a portion or point on the interactive AR content 715. As seen in interface 710, the interaction input 720 may stretch the interactive AR content 715 based on one or more attributes of the input 720.

Figure 8:
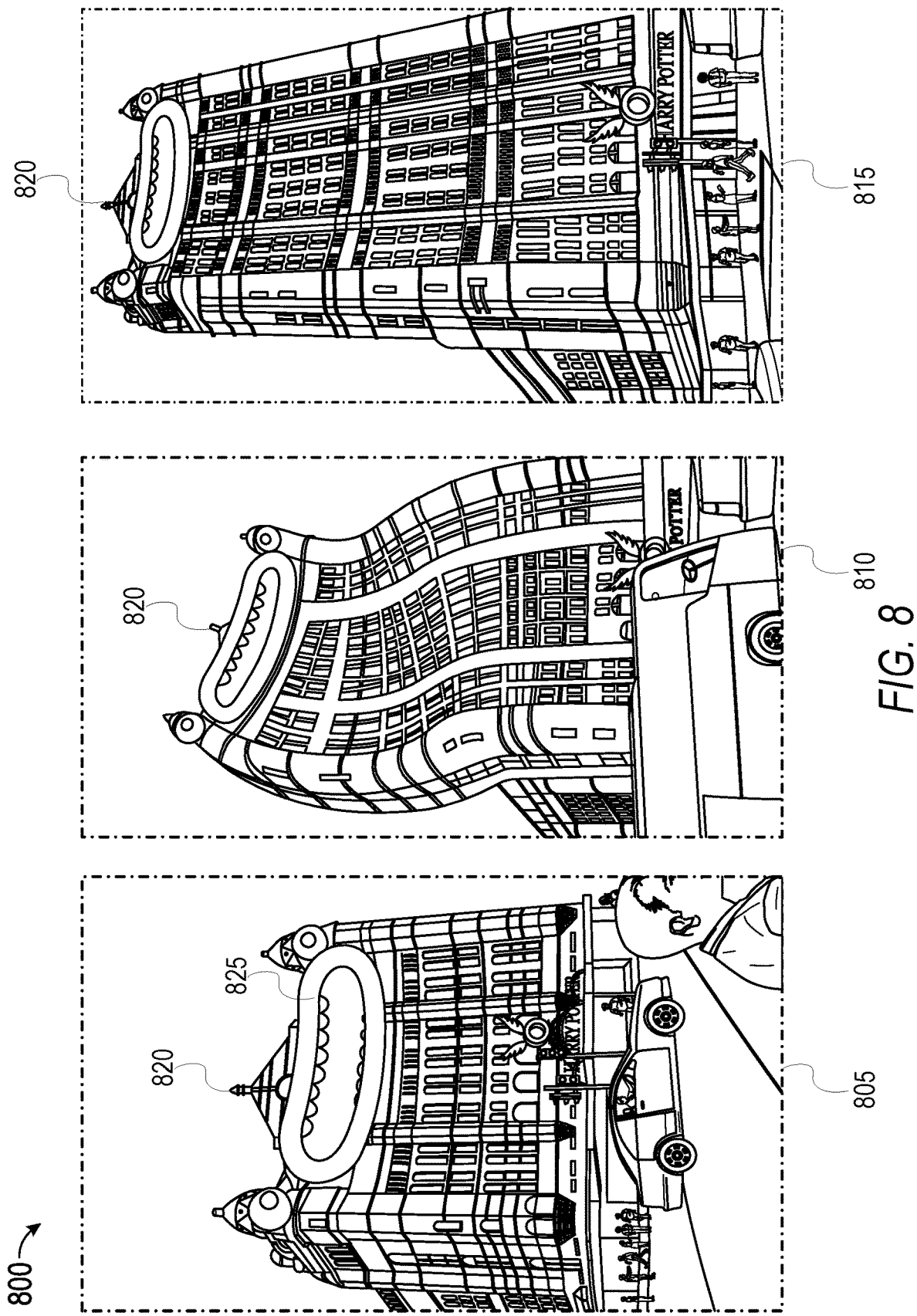
FIG. 8 is an interface flow-diagram depicting interactive AR content, according to certain example embodiments.

FIG. 8 is an interface flow-diagram 800 depicting interactive AR content, according to certain example embodiments, and as described in the methods 400 and 600.

As seen in the interface 805, the interactive AR content 820 may include a media overlay generated based on one or more attributes of an object depicted within a presentation of an environment (i.e., a building), wherein the media overlay may also comprise a plurality of graphical elements 825. For example, as seen in the interface flow-diagram 800, the plurality of graphical elements 825 may include graphical features to personify an object identified within a presentation of an environment. According to certain example embodiments, the plurality of graphical elements 825 may be generated by the media module 304 based on contextual data that includes user profile data associated with the client device 102.

As seen in the interfaces 810 and 815, the display of the interactive AR content 820 within the presentation of the environment may move (i.e., stretch, grow, flex, bend) based on inputs received from the client device 102, as well as based on interactions between objects depicted within the presentation of the environment at the client device 102.

As an illustrative example for a perspective of a user of the client device 102, responsive to detecting the client device 102 at a predefined location relative to an object, or a threshold distance from the object, the AR system 124 may cause the interactive AR content 820 to perform a corresponding animation. For example, if the user approaches the object corresponding to the interactive AR content 820 (i.e., the building), the AR system 124 may cause the interactive AR content 820 to stretch and bend based on a location of the client device 102.

Figure 9:
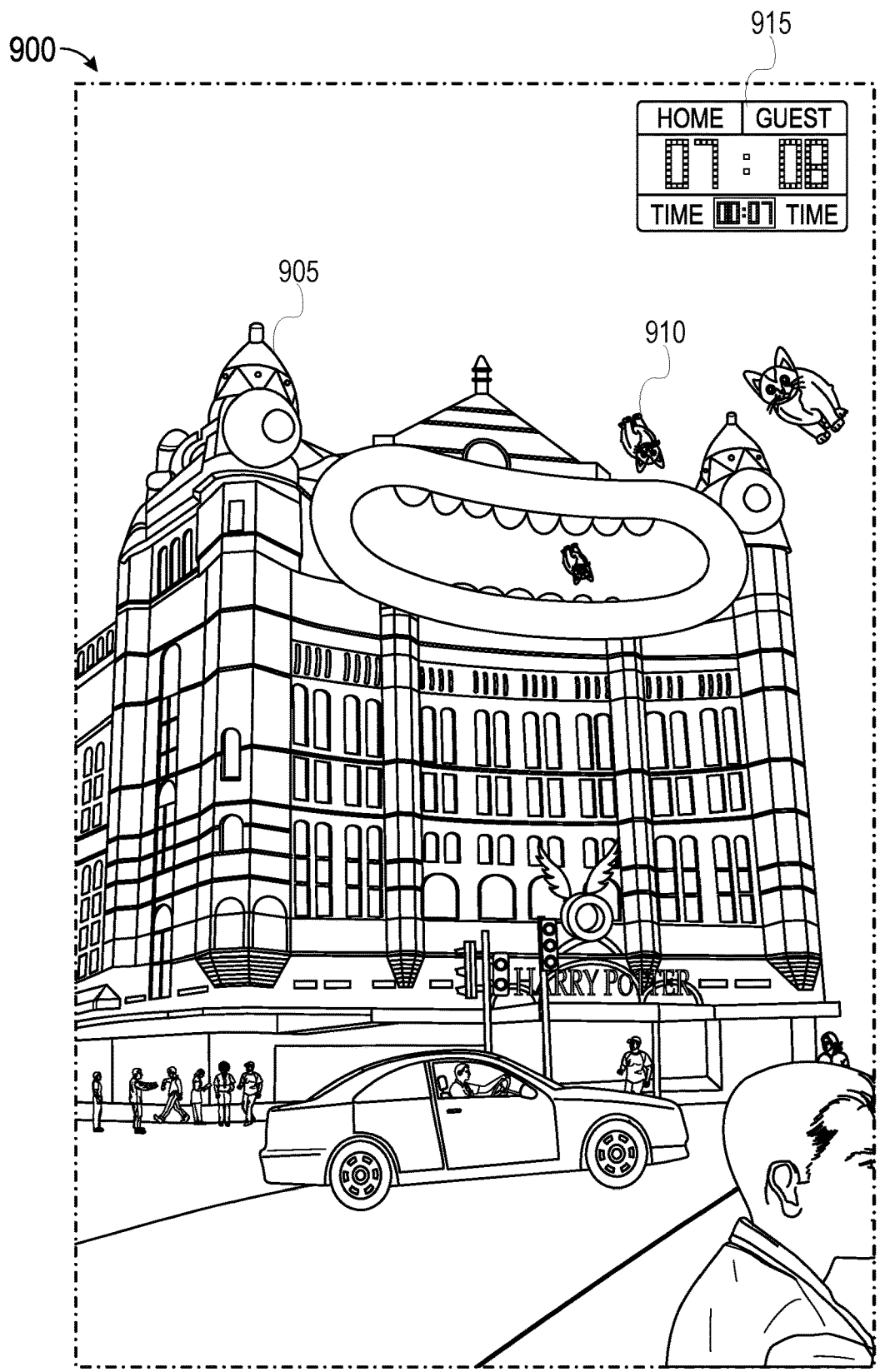
FIG. 9 is an interface diagram depicting interactive AR content, according to certain example embodiments.

FIG. 9 is an interface diagram 900 depicting interactive AR content 905, according to certain example embodiments, and as discussed in the method 500 depicted in FIG. 5.

Software Architecture

Figure 10:
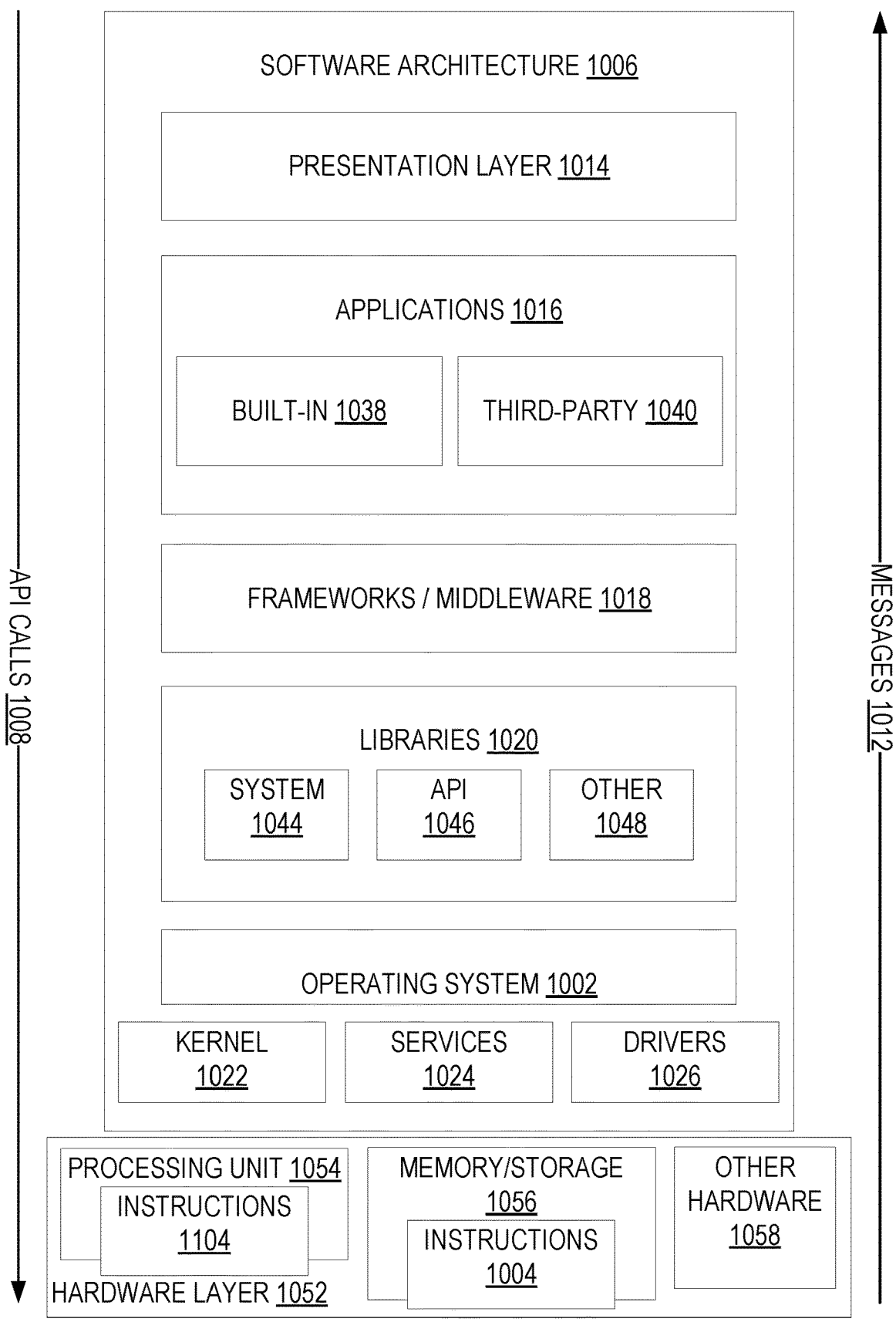
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1214, and I/O components 1218. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
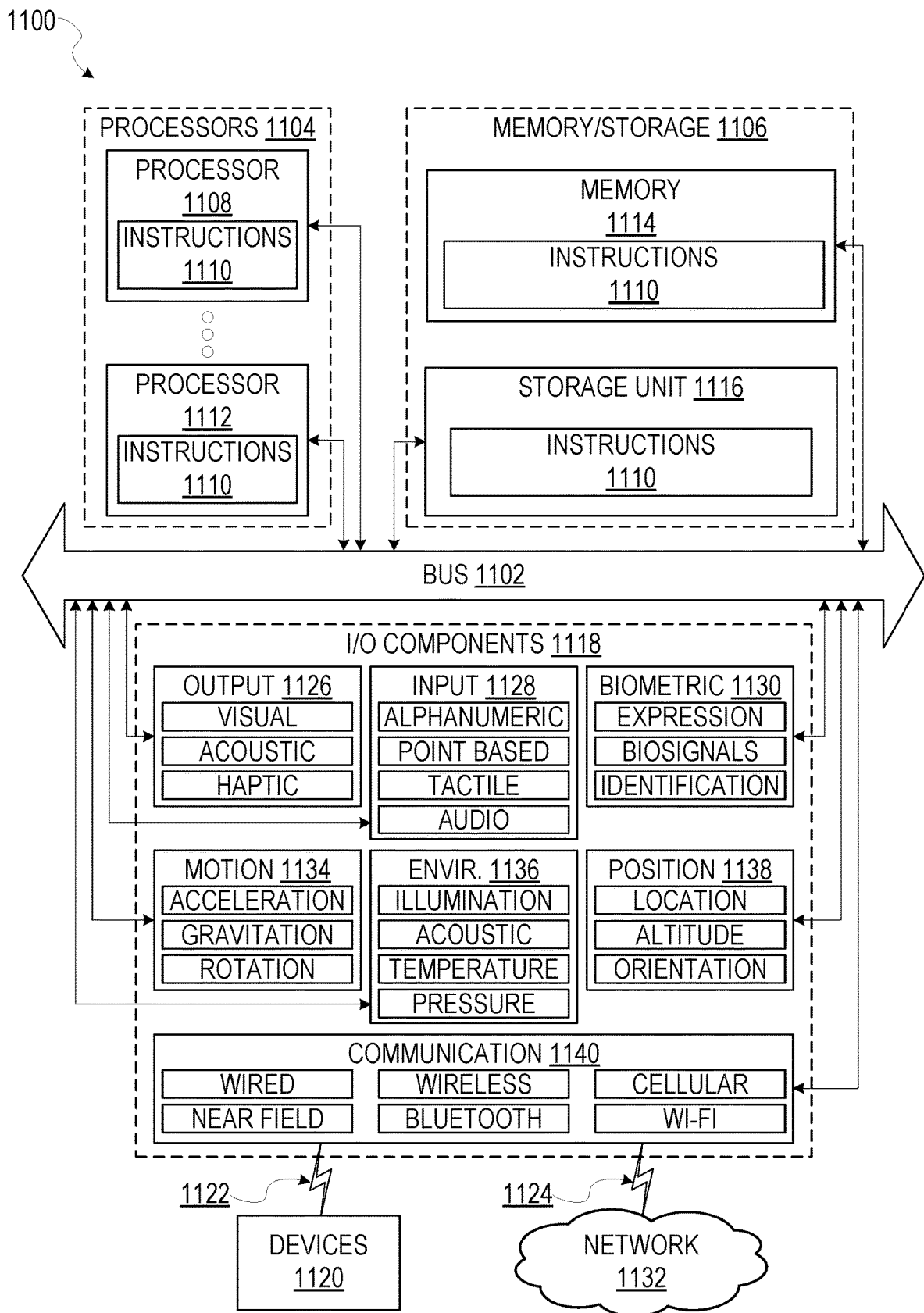
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:
1. A method comprising:
causing display of a presentation of an environment within a graphical user interface at a client device, the presentation of the environment including a display of an object that comprises an attribute;
determining a context associated with the client device, the context including a number of client devices within a threshold distance of the client device;
accessing a mesh model from among a plurality of mesh models based on the context;
generating a texture map based on the attribute of the object displayed within the presentation of the environment; and
causing display of Augmented-Reality (AR) content within the presentation of the environment based on the texture map and the mesh model.

2. The method of claim 1, further comprising:
identifying the object based on the display of the object.

3. The method of claim 2, wherein the identifying the object includes:
accessing location data that identifies a location of the client device; and
identifying the object based on the location of the client device and the attribute of the object.

4. The method of claim 1, wherein the context is based on user profile data associated with the client device.

5. The method of claim 1; wherein the determining the context associated with the client device is based on temporal data.

6. The method of claim 1, further comprising:
receiving an input that comprises an input attribute; and
displaying the AR content based on the input attribute of the input.

7. The method of claim 6, wherein the input attribute includes a directional component.

8. A non-transitory machine-readable storage medium comprising instructions that, when executed by one or more processors of a machine; cause the machine to perform operations comprising:
causing display of a presentation of an environment within a graphical user interface at a client device, the presentation of the environment including a display of an object that comprises an attribute;
determining a context associated with the client device, the context including a number of client devices within a threshold distance of the client device;
accessing a mesh model from among a plurality of mesh models based on the context;
generating a texture map based on the attribute of the object displayed within the presentation of the environment; and causing display of Augmented-Reality (AR) content within the presentation of the environment based on the texture map and the mesh model.

9. The non-transitory machine-readable storage medium of claim 8, further comprising:
identifying the object based on the display of the object.

10. The non-transitory machine-readable storage medium of claim 9, wherein the identifying the object includes:
accessing location data that identifies a location of the client device; and
identifying the object based on the location of the client device and the attribute of the object.

11. The non-transitory machine-readable storage medium of claim 8, wherein the context is based on user profile data associated with the client device.

12. The non-transitory machine-readable storage medium of claim 8, wherein the determining the context associated with the client device is based on temporal data.

13. The non-transitory machine-readable storage medium of claim 8, further comprising:
receiving an input that comprises an input attribute; and
displaying the AR content based on the input attribute of the input.

14. The non-transitory machine-readable storage medium of claim 13, wherein the input attribute includes a directional component.

15. A system comprising:
a memory; and
at least one hardware processor coupled to the memory and comprising instructions that causes the system to perform operations comprising:
causing display of a presentation of an environment within a graphical user interface at a client device, the presentation of the environment including a display of an object that comprises an attribute;
determining a context associated with the client device, the context including a number of client devices within a threshold distance of the client device;
accessing a mesh model from among a plurality of mesh models based on the context;
generating a texture map based on the attribute of the object displayed within the presentation of the environment; and
causing display of Augmented-Reality (AR) content within the presentation of the environment based on the texture map and the mesh model.

16. The system of claim 15, further comprising:
identifying the object based on the display of the object.

17. The system of claim 16, wherein the identifying the object includes:
accessing location data that identifies a location of the client device; and
identifying the object based on the location of the client device and the attribute of the object.

18. The system of claim 15, wherein the context is based on user profile data associated with the client device.

19. The system of claim 15, wherein the determining the context associated with the client device is based on temporal data.

20. The system of claim 15, further comprising:
receiving an input that comprises an input attribute; and
displaying the AR content based on the input attribute of the input.

* * * * *